July 9, 1940.  C. BURNS  2,207,431

SELF ENERGIZING BRAKE

Original Filed June 14, 1937  2 Sheets-Sheet 1

INVENTOR.
Charles Burns.
BY
ATTORNEY.

INVENTOR.
Charles Burns
BY Samuel Weisman
ATTORNEY.

Patented July 9, 1940

2,207,431

UNITED STATES PATENT OFFICE 2,207,431

SELF-ENERGIZING BRAKE

Charles Burns, Thamesville, Ontario, Canada

Application June 14, 1937, Serial No. 148,191
Renewed April 12, 1940

3 Claims. (Cl. 188—72)

The present invention pertains to a novel brake designed particularly for use in connection with motor vehicles.

The principal object of the invention is to provide an effective and efficient brake consisting of comparatively few and inexpensive parts and of simple design and assembly. Incidental to this principal object, the invention provides a brake having a greater braking force than a conventional internal or external brake of equal size. Further, the invention provides a brake that is self-energizing in both directions, self-compensating for wear of the lining or friction material and unaffected in its operation by expansion or contraction of the outer housing under temperature changes.

These objects are accomplished by a mechanism that exerts the ultimate braking action in an axial rather than radial direction. In other words, the actual braking action occurs on flat surfaces perpendicular to the axle rather than on the peripheral or circumferential surface of a brake drum.

More specifically, the brake includes a floating pressure plate and a rotating plate adjacent thereto. In the operation of the brake, a shifting member moves the floating plate into engagement with the friction plate, whereupon the former also rotates. Associated with the floating plate is a cam arrangement whereby the pressure of the rotating friction plate against a fixed friction plate is automatically increased in a self-energizing manner to furnish the final and maximum braking pressure.

The construction of the braking surfaces is such as to permit self-compensation for wear of the friction material and to permit rapid cooling of the friction plate. These and other advantages of the invention will be discussed in detail as the description proceeds.

The invention is fully disclosed by way of example by the following description and the accompanying drawings, in which Figure 1 is a side elevation of the brake showing a portion of the cover plate removed;

Reference to these views will now be made by use of like characters that are employed to designate corresponding parts throughout.

Figure 2:
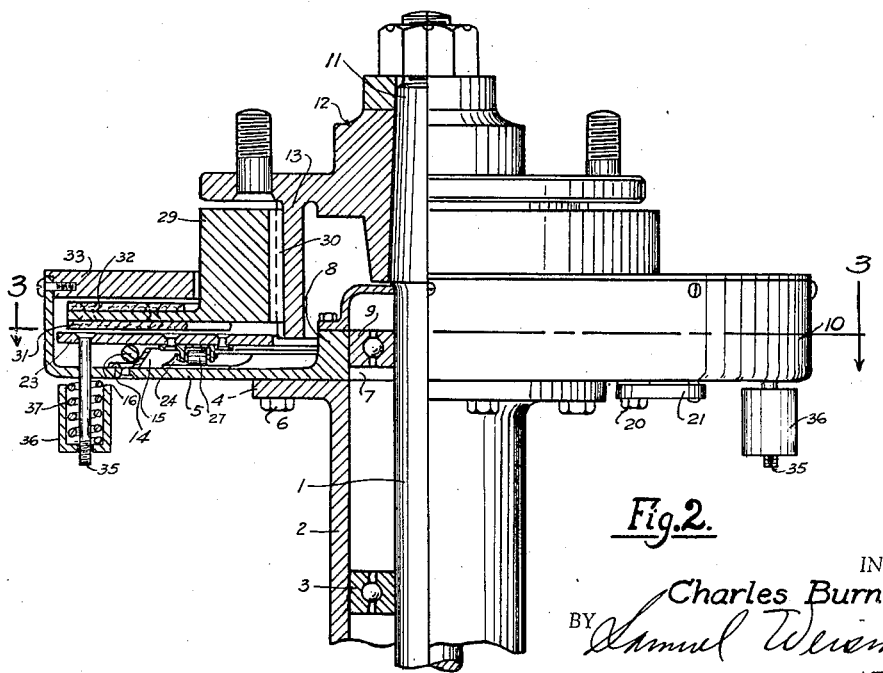
Figure 2 is a plan view, partly in radial section.

The brake constructed according to the present invention is adapted to be mounted on a conventional axle housing as illustrated more clearly in Figure 2. This figure shows the usual axle 1 enclosed in a fixed housing 2 supported by bearings 3.

The outer end of the axle housing is flanged at 4, and adjacent to this flange is mounted a brake housing 5 secured thereto by bolts 6. The brake housing has a central opening 7 defined by an inward hub 8 that rolls on bearings 9 engaging the axle 1. The brake housing also has a marginal flange or wall 10 that imparts a dished configuration to the housing for containing the internal parts as will presently appear.

On the outer conical end 11 for the axle 1 is mounted a hub 12 having a conventional outer appearance but modified by the provision of an inward flange or adaptor 13 for a purpose that will presently appear. The flange may be welded on a conventional hub or, if preferred, originally formed as an integral part thereof.

To the flat wall of the brake housing 5, 10, is secured a receiving and wedging ring 14 preferably concentric with the axle. The ring has a conical flange 15 that tapers toward the nearer end of the axle. The flange is surrounded and engaged by a cable 16 (Figure 3) having one end fixed at 17 to the brake housing and the other end provided with a coupling 18 slidably mounted in a slot 19 formed in the wall 5 of the brake housing. Adjacent to the slot 19, is a pivot bolt 20 for a bell crank lever, one arm 21 of which is articulated to the coupling 18 and the other arm 22 of which is adapted for connection to suitable brake operating means such as linkage or cable leading to the brake pedal.

Figure 4:
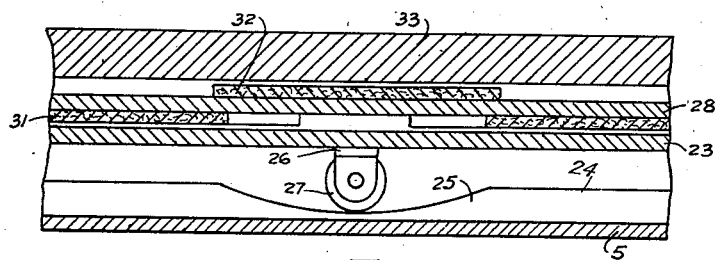
Figure 4 is a developed section on the line 4—4 of Figure 3.

Within the brake housing and over the cable 16 is mounted a flat pressure plate 23 beneath which is a circular cam plate 24 fixed to the wall 5 as illustrated more clearly in Figure 4. The cam plate is formed at intervals with concave grooves or cam faces 25. For each such cam face, a roller bracket 26 is attached to the plate 23 and carries a roller 27 riding on the cam face for a purpose that will presently be described.

Adjacent to the pressure plate 23 is mounted a friction plate 28 having a hub 29 for supporting purposes. The parts 13 and 29 are locked together by a series of keys 30. Since the hub 29 turns with the axle, the friction plate 28 also turns therewith.

Figure 1:
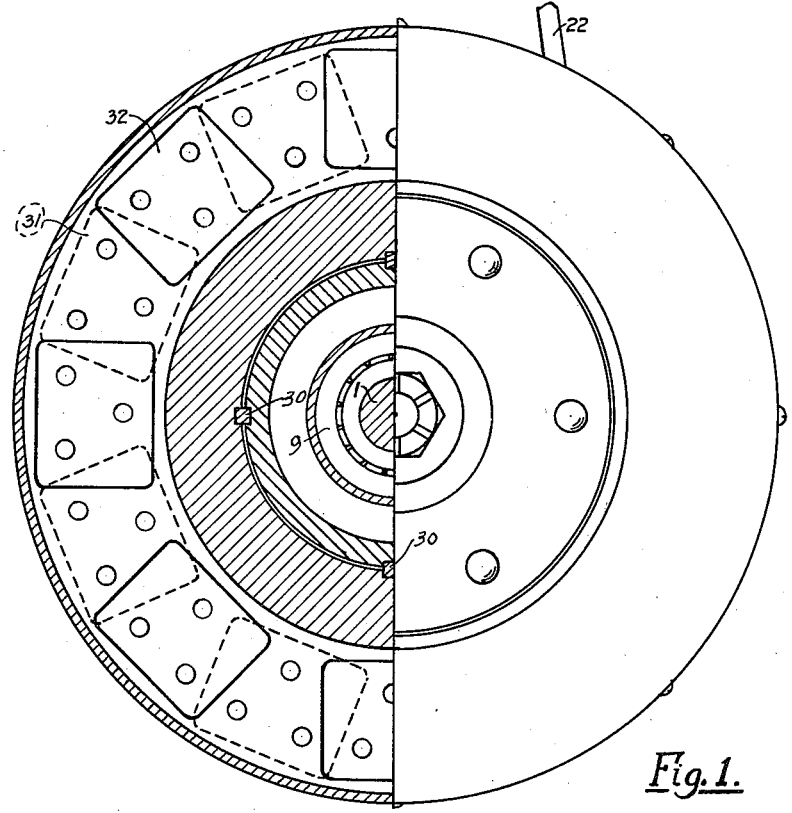

The friction surfaces are formed by means of friction pads 31 and 32 fastened respectively to opposite sides of the plate 28. These pads are preferably of a molded material. It will be seen in Figures 1 and 4 that the pads are spaced on the respective surfaces of the plate 28, the pads 32 bridging the spaces between the pads 31, and vice versa. This arrangement leaves a considerable portion of each surface of the plate 28 uncovered or bare, with the result that the heat generated in the plate 28 during the braking action is more rapidly dissipated. The assembly is completed by a combined cover and friction plate 33 overlying pads 32 and fixed to the free edge of the side wall 10 of the brake housing as clearly illustrated in Figure 2.

Figure 3:
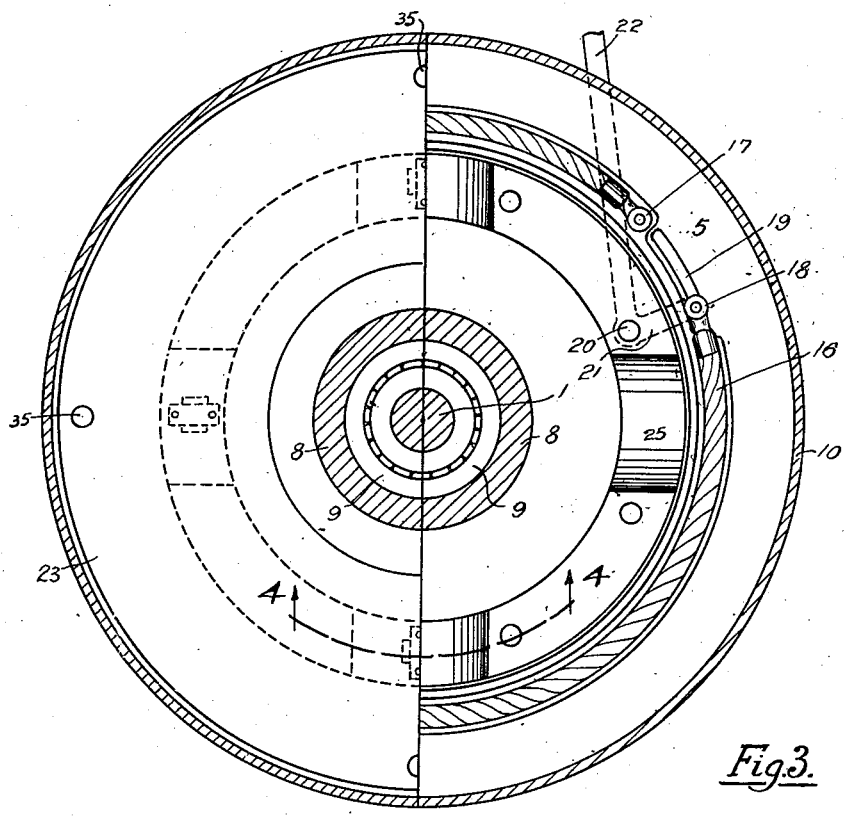
Figure 3 is a section on the line 3—3 of Figure 2.

In the operation of the device, the initial action such as the depression of a pedal or the pulling of a lever rocks the bell crank lever 20, 21, and moves the free end of cable 16 in the slot 19 in the counter-clockwise direction with reference to Figure 3. The cable while contracting slides on the conical flange 15 and moves the plate 23 into contact with the pads 31, whereby there is introduced a light braking action sufficient to turn the plate 23 with the rotating plate 28. By rotation of the plate 23 and the accompanying movement of the rollers 27 in the cam groove 25, the pressure between this plate and the pads 31 is increased in a self-energizing manner. The same action of plate 28 also brings the pads 32 into braking engagement with the cover plate 33. The self-energizing effect resulting from the movement of the rollers 27 in the cam grooves 25 is obviously operable in both directions of rotation of the wheel.

With reference to the several advantages of the invention previously mentioned, it is now apparent that the brake made according to the invention is comparatively inexpensive inasmuch as it comprises relatively few and simple parts. Increased braking force for a given size of brake results from the mounting of the friction pads on both sides of the flat plate 28. This construction provides a greater area of effective braking surface than in the case of the customary peripheral brake lining with cooperating brake shoes.

This mounting of the friction pads also has the advantages of being self-compensating for wear of the brake lining. As the lining or friction material wears, the cable 16 merely requires increased contraction which may be initially introduced by drawing up the linkage or connection extending to the bell crank lever 21, 22.

It is also to be noted that the braking action is independent of the usual function of a brake drum and is therefore unaffected by expansion or contraction of the housing with temperature changes.

The plate 23 is fitted with two or more studs 35 passing through the housing 5 and carrying thimbles 36 outside of the housing. Each thimble contains a compressed spring 37 bearing against the housing and normally tending to release the brake, whereby the braking action is automatically discontinued when the cable 16 is relaxed.

Although a specific embodiment of the invention has been illustrated and described, it will be understood that various alterations in the details of construction may be made without departing from the scope of the invention, as indicated by the appended claims.

What I claim is:

1. In a brake housing, a friction plate carried thereby, a floating pressure plate in said housing, another friction plate between the first-named plates and adapted for rotation relative to said housing, a conical ring fixed in said housing concentric therewith and tapering towards said floating plate, a cable surrounding said ring and having one end fixed to said housing and the other end slidably mounted, and actuating mechanism connected to said other end, said cable being engageable with said floating plate.

2. In a brake housing, a friction plate carried thereby, a floating pressure plate in said housing, another friction plate between the first-named plates and adapted for rotation relative to said housing, a conical ring fixed in said housing concentric therewith and tapering towards said floating plate, a cable surrounding said ring and having one end fixed to said housing and the other end slidably mounted, and actuating mechanism connected to said other end, said cable being engageable with said floating plate, and means carried by said floating plate and housing for automatically urging said floating plate toward said friction plates on relative rotation between the said floating plate and housing.

3. In a brake housing, a friction plate carried thereby, a floating pressure plate in said housing, another friction plate between the first-named plates and adapted for rotation relative to said housing, a conical ring fixed in said housing concentric therewith and tapering towards said floating plate, a cable surrounding said ring and having one end fixed to said housing and the other end slidably mounted, and actuating mechanism connected to said other end, said cable being engageable with said floating plate, a cam ring carried by said housing and having cam faces, rollers carried by said floating plate and repectively engaging said faces, whereby said floating plate is automatically moved toward said friction plates on relative rotation between the said floating plate and housing.

CHARLES BURNS.